United States Patent
Dar et al.

(10) Patent No.: US 11,936,640 B2
(45) Date of Patent: Mar. 19, 2024

(54) METHOD OF DISTRIBUTING CLIENT CERTIFICATES TO MACHINES WITH SHARED CLOUD ACCOUNT ACCESS

(71) Applicant: VMware LLC, Palo Alto, CA (US)

(72) Inventors: Chen Dar, Magshimim (IL); Aran Bergman, Givatayim (IL); Alex Markuze, Ramat Gan (IL); Israel Cidon, San Francisco, CA (US); Eyal Zohar, Shimshit (IL); Igor Golikov, Kfar Saba (IL)

(73) Assignee: VMware LLC, Palo Alto, CA (US)

(*) Notice: Subject to any disclaimer, the term of this patent is extended or adjusted under 35 U.S.C. 154(b) by 83 days.

(21) Appl. No.: 17/185,225

(22) Filed: Feb. 25, 2021

(65) Prior Publication Data
US 2022/0038452 A1 Feb. 3, 2022

Related U.S. Application Data

(60) Provisional application No. 63/057,845, filed on Jul. 28, 2020.

(51) Int. Cl.
*G06F 21/33* (2013.01)
*G06F 9/455* (2018.01)
(Continued)

(52) U.S. Cl.
CPC ...... *H04L 63/0823* (2013.01); *G06F 9/45558* (2013.01); *H04L 63/0236* (2013.01);
(Continued)

(58) Field of Classification Search
None
See application file for complete search history.

(56) References Cited

U.S. PATENT DOCUMENTS

| 10,205,701 B1* | 2/2019 | Voss ................... H04L 61/4511 |
| 2013/0125124 A1* | 5/2013 | Kempf .................. H04L 49/70 718/1 |

(Continued)

OTHER PUBLICATIONS

Utilizing a lightweight PKI mechanism to guarantee a secure service in a cloud environment. Park. Springer. (Year: 2018).*
(Continued)

*Primary Examiner* — Venkat Perungavoor
(74) *Attorney, Agent, or Firm* — Quarles & Brady LLP (57) ABSTRACT

Some embodiments provide a method for providing a resource to a particular virtual private cloud that is deployed in a set of datacenters that host multiple virtual private clouds. At a resource issuer, the method receives a resource request from a particular machine deployed in the particular virtual private cloud, the resource request including a first set of cloud-specific data. The method obtains a cloud identifier for the particular machine from a registry service of the particular virtual private cloud that interacts with a datacenter-set cloud service that deploys machines in the datacenter set for different virtual private clouds. The method uses the obtained cloud identifier to obtain a second set of cloud-specific data for the particular machine from the datacenter-set cloud service. Upon determining that the first and second sets of cloud-specific data match, the method authenticates the particular machine and issues the resource for the particular machine.

22 Claims, 6 Drawing Sheets

(51) Int. Cl.
*G06F 21/45* (2013.01)
*H04L 9/40* (2022.01)
*G06F 21/60* (2013.01)
*G06F 21/71* (2013.01)

(52) U.S. Cl.
CPC ...... *H04L 63/0272* (2013.01); *H04L 63/0876* (2013.01); *G06F 2009/45587* (2013.01); *G06F 2009/45595* (2013.01)

(56) References Cited

U.S. PATENT DOCUMENTS

| | | | | |
|---|---|---|---|---|
| 2014/0115584 | A1* | 4/2014 | Mudigonda | H04L 67/131 718/1 |
| 2015/0134777 | A1* | 5/2015 | Onoue | G06F 9/45558 709/217 |
| 2015/0301814 | A1* | 10/2015 | Chen | G06F 8/60 717/177 |
| 2016/0323183 | A1* | 11/2016 | Jeuk | H04L 41/5058 |
| 2017/0230467 | A1* | 8/2017 | Salgueiro | H04L 67/563 |
| 2019/0068495 | A1* | 2/2019 | Jeuk | H04L 45/02 |
| 2020/0159563 | A1* | 5/2020 | Luo | G06F 9/455 |
| 2023/0123162 | A1* | 4/2023 | Yadhav | H04W 36/0094 370/331 |

OTHER PUBLICATIONS

A Authentication and Access Authorization Mechanism on the PaaS Platform. Xu. IEEE. (Year: 2019).*

* cited by examiner

METHOD OF DISTRIBUTING CLIENT CERTIFICATES TO MACHINES WITH SHARED CLOUD ACCOUNT ACCESS

BACKGROUND

Today, multiple organizations can have administrator-level access to the same cloud account such that any organization that can access the cloud account can also access resources (e.g., IP (Internet Protocol) addresses) of the cloud account. For instance, a first organization can use a tenant's account credentials to deploy a service (e.g., a virtual machine) to the tenant's cloud, which is provided by a second organization. One benefit of this approach is that the first organization is able to use the tenant's cloud pricing model, which may be different (i.e., better) than the pricing model that the first organization can get from the second organization. Additional benefits can include being able to connect to other services deployed by the tenant using private addresses, which would reduce cloud network expenses, and/or benefitting from higher aggregate network pricing when counting all tenant traffic in one basket.

In current implementations, in order for the first organization to provide a certificate or other authentication resource to the deployed service, the first organization can put a secret in a particular domain, and if that secret can be accessed by the deployed service, the certificate or other authentication resource (e.g., a key) is issued to the deployed service. However, since any user with access to the tenant's cloud also has access to the full capabilities of the cloud account, these users can reassign IP addresses of services deployed in the tenant's cloud account by the first organization without the first organization having any way of recognizing that the IP addresses have been reassigned to other entities or services in the cloud (i.e., at least not immediately). As a result, the IP addresses assigned to the deployed services are no longer sufficient or reliable identifiers of the deployed services, and thus cannot be used to verify the authenticity of the deployed services (e.g., by a public key infrastructure (PKI) that issues authentication resource from the first organization to deployed services).

BRIEF SUMMARY

Some embodiments provide a method for providing an authentication resource to a particular virtual private cloud that is deployed in a set of datacenters that host multiple virtual private clouds. At a resource issuer, the method receives an authentication resource request that includes a first set of cloud-specific data from a particular machine deployed in the particular virtual private cloud. The method obtains a cloud identifier for the particular machine from a registry service of the particular virtual private cloud that interacts with a datacenter-set cloud service (also described herein as a cloud provider interface module) that deploys machines for different virtual private clouds in the datacenter set. Using the obtained cloud identifier, the method obtains a second set of cloud-specific data from the datacenter-set cloud service. When the method determines that the first and second sets of cloud-specific data match, the method authenticates the particular machine and issues an authentication resource for the particular machine.

In some embodiments, the resource issuer is a public key infrastructure (PKI) responsible for authenticating machines deployed in the virtual private clouds of the datacenter set by the datacenter set-cloud service. The PKI relies on both the registry service and the datacenter-set cloud service to authenticate requesting machines, according to some embodiments. In some embodiments, the authentication resource requests are certificate signing requests (CSRs). In other embodiments, the authentication resource requests are requests for keys, java tokens, certificate bundles, etc. Machines that have been authenticated by the PKI (e.g., possess signed certificates) are considered to be trusted devices (e.g., trusted by the domain that deploys the machine), according to some embodiments.

In some embodiments, obtaining a cloud identifier from the registry service includes determining whether a machine associated with a public IP address (or other IP address) identified in the request (i.e., as part of the first set of cloud-specific information) exists in the registry. Each of the first and second sets of cloud-specific data, in some embodiments, include at least an IP address. In some embodiments, the PKI (e.g., resource issuer) provides the public IP address identified in the authentication resource request to the registry service for the registry service to use to identify an associated cloud identifier in its registry, if one exists. If the registry service is unable to identify a cloud identifier associated with the provided public IP address, the PKI denies the authentication resource request from the requesting machine, according to some embodiments.

Alternatively, when the registry service does return a cloud identifier to the PKI verifying that a machine having the provided public IP address exists, the PKI uses the obtained cloud identifier to request additional information relating to a machine corresponding to the cloud identifier from the datacenter-set cloud service, according to some embodiments. The datacenter-set cloud service in some embodiments uses the cloud identifier to identify and provide the requested additional information (e.g., the second set of cloud-specific data) to the PKI. In some embodiments, the additional information includes an IP address currently assigned to the machine (e.g., the machine having the cloud identifier) at the time of the request.

Upon receiving the additional information from the datacenter-set cloud service, the PKI compares the current IP address associated with the cloud identifier provided with the additional information (i.e., second set of cloud-specific data) with the public IP address identified from the authentication resource request (i.e., first set of cloud-specific data) to determine whether the IP address identified in the request matches the current IP address associated with the cloud identifier at the time of the request as provided by the datacenter-set cloud service, according to some embodiments. Doing so ensures (1) that another entity (e.g., the cloud customer/tenant of the virtual private cloud, and/or a third-party entity with access to the virtual private cloud) has not used the public IP address assigned to the machine for another device, and (2) that the IP address is currently used by the same machine at the time the PKI processes the CSR.

If the PKI determines that the requesting machine is not authentic (i.e., public IP address identified in the request does not match the current IP address associated with the corresponding cloud identifier), the PKI issues a denial to the requesting machine, according to some embodiments. Otherwise, if the machine is authenticated (i.e., the cloud identifier/public IP address pairs match), the PKI issues the authentication resource (e.g., signed certificate, key, certificate bundle, etc.) to the requesting machine, according to some embodiments.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

BRIEF DESCRIPTION OF FIGURES

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for providing an authentication resource to a particular virtual private cloud that is deployed in a set of datacenters that host multiple virtual private clouds. At a resource issuer, the method receives an authentication resource request that includes a first set of cloud-specific data from a particular machine deployed in the particular virtual private cloud. The method obtains a cloud identifier for the particular machine from a registry service of the particular virtual private cloud that interacts with a datacenter-set cloud service (also referred to herein as a cloud provider interface module) that deploys machines for different virtual private clouds in the datacenter set. Using the obtained cloud identifier, the method obtains a second set of cloud-specific data from the datacenter-set cloud service. When the method determines that the first and second sets of cloud-specific data match, the method authenticates the particular machine and issues an authentication resource for the particular machine.

In some embodiments, the resource issuer is a public key infrastructure (PKI) responsible for authenticating machines deployed in the virtual private clouds of the datacenter set by the datacenter-set cloud service. The PKI relies on both the registry service and the datacenter-set cloud service to authenticate requesting machines, according to some embodiments. In some embodiments, the registry service is a controller that instructs the datacenter-set cloud service to generate new machines to be deployed in any one of the virtual private clouds in the datacenter set.

Figure 1A:
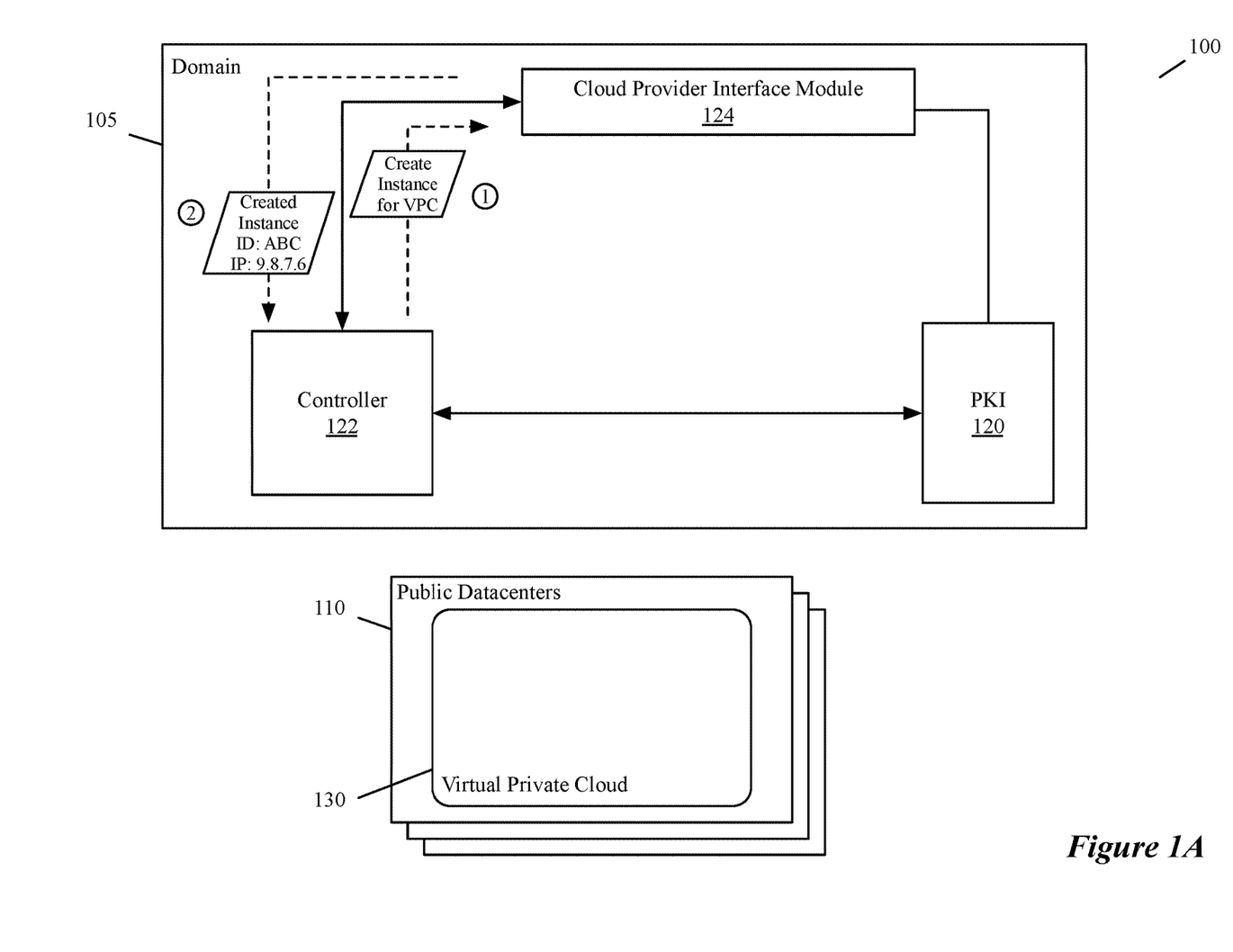
FIG. 1A conceptually illustrates an example embodiment of a domain generating a machine to be deployed in a virtual private cloud, according to some embodiments.

FIG. 1A conceptually illustrates an example embodiment of a domain generating a machine to be deployed in a virtual private cloud. In this example, the network 100 includes a domain 105 and a set of public datacenters 110 that host multiple virtual private clouds such as the virtual private cloud 130. As shown, the domain 105 includes a public key infrastructure (PKI) 120, a controller 122, and cloud provider interface module 124. In some embodiments, the entities of the domain 105 (e.g., the PKI 120, the controller 122, and the cloud provider interface module 124) operate in any one of the public datacenters of the set 110.

In some embodiments, the controller 122 and the cloud provider interface module 124 communicate in order to generate machines (or instances of machines) to be deployed in tenant clouds, such as the virtual private cloud 130 of the public datacenters 110. The provider of the tenant cloud, in some embodiments, is different from the provider of the domain 105 that is deploying machines in the virtual private clouds. In some such embodiments the tenant cloud provider grants permission to the provider of the domain to deploy the machines.

Once permission is granted, the controller 122 in some embodiments sends a request to the cloud provider interface module 124 to create a new machine (e.g., instance) to be deployed in a virtual private cloud. For example, the controller 122 sends a request at the encircled 1 to the cloud provider interface module 124 to create a new instance to be deployed in the virtual private cloud 130. The cloud provider interface module 124 then creates (e.g., using cloud APIs (Application Programming Interfaces)) the new machine and provides an identifier for the machine, along with a public IP address of the machine, to the controller 122 (e.g., at the encircled 2). Alternatively, the cloud provider interface module 124 in some embodiments only provides the machine's identifier to the controller 122, which can be used by the controller to query the cloud provider interface module for the public IP address (or any IP address) of the machine.

The identifier for the machine, in some embodiments, is the identifier assigned to the machine by the tenant cloud provider. The public IP address in some embodiments is a public IP address assigned to the machine by the provider of the domain. Since a public IP address is a resource that is either associated with a machine or not, the public IP address in other embodiments may be an IP address assigned to the machine by a different entity (e.g., a user with access to the virtual private cloud account) after the machine has been deployed in the virtual private cloud.

In some embodiments, as will be described in further detail below, the cloud provider interface module 124 provides at least the machine's identifier to the controller 122 in order to register the machine with a registry service of the controller that includes identifiers of all machines created through the controller. The controller can later use the machine identifiers in the registry service to authenticate and verify the existence and identity of these machines, according to some embodiments. In some embodiments, the cloud provider interface module 124 may also provide an IP address (public or private) associated with the machine to the controller 122 along with the machine's identifier, according to some embodiments. Otherwise, the controller 122 can use the machine's identifier to query the cloud provider interface module for the IP address associated with the machine. The operations for creating a new machine for deployment in a virtual private cloud will also be discussed further below with reference to FIG. 2.

Figure 1B:
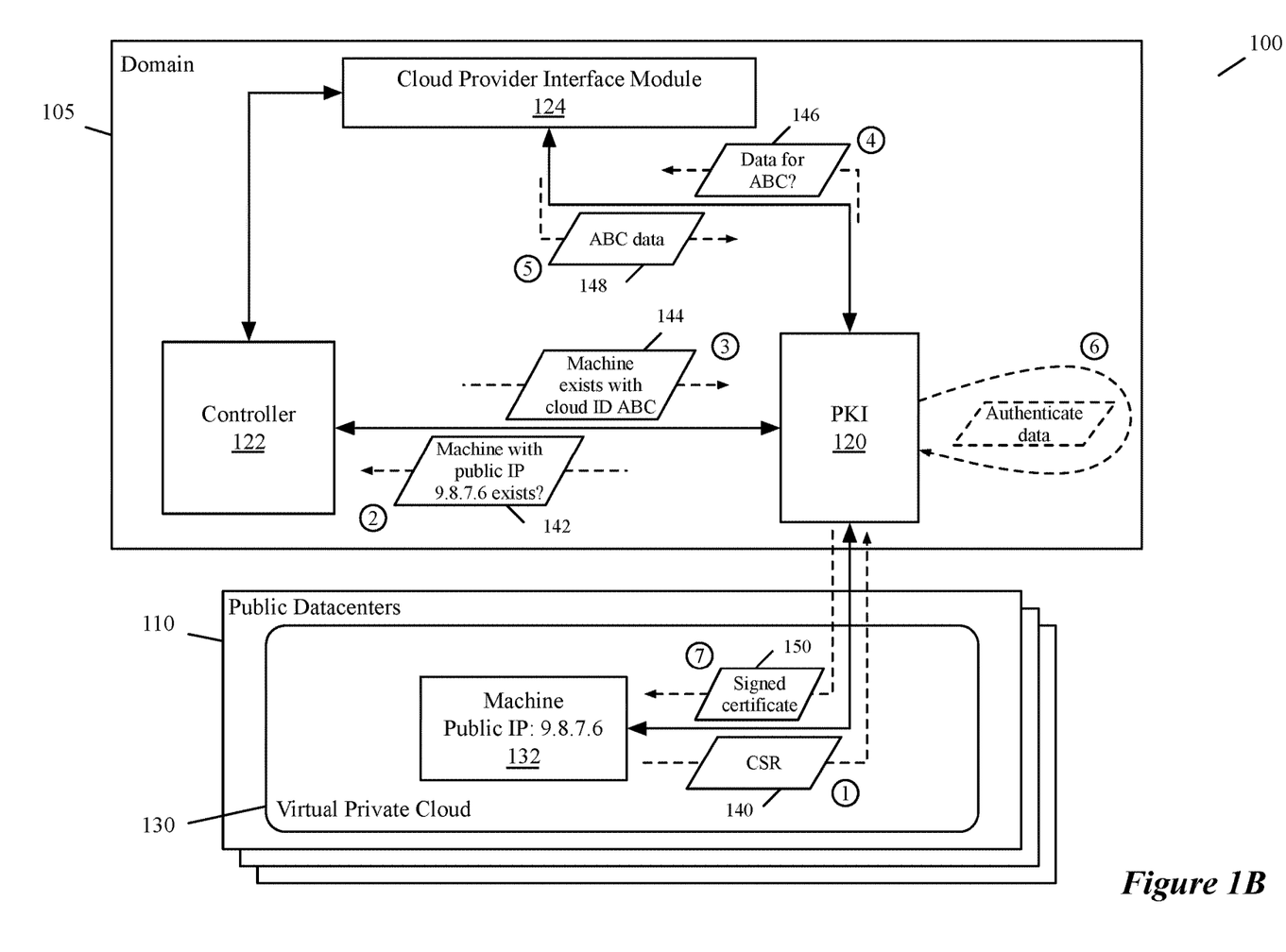
FIG. 1B conceptually illustrates an example embodiment of a datacenter set that includes a virtual private cloud in which a domain deploys a particular machine, according to some embodiments.

FIG. 1B conceptually illustrates an example embodiment of a datacenter set that includes a virtual private cloud in which a domain deploys a particular machine. In this example, the network 100 includes a domain 105 and a set of datacenters 110 that host multiple virtual private clouds such as the virtual private cloud 130 in which the machine 132 is deployed. The domain 105 includes a public key infrastructure (PKI) 120, a controller 122, and cloud provider interface module 124. As noted above, in some embodiments, the entities of the domain 105 (e.g., the PKI 120, the controller 122, and the cloud provider interface module 124) operate in any one of the public datacenters of the set 110.

The machine 132 is deployed in the virtual private cloud 130 by cloud provider interface module 124, as described for FIG. 1A. The machine 132, in some embodiments, is a virtual machine (VM), a container, a gateway VM, an instance of a VM, etc. In some embodiments, the machine 132 is a forwarding element that is used to establish secure connection links (e.g., tunnels) with the provider from which they are deployed. For example, the machine 132 communicates with the PKI 120 in the domain 105. When the machine 132 is authenticated by the domain 105 (e.g., receives the requested authentication resource from the PKI), in some embodiments, the machine 132 can also establish communications with the controller 122. While the example embodiment in FIG. 1B shows a single machine 132 in a single virtual private cloud 130, other embodiments may include multiple machines deployed in multiple virtual private clouds of the datacenter set 110.

The virtual private clouds, in some embodiments, are virtual private clouds within a public cloud environment. Examples of public cloud providers include Amazon Web Services (AWS), Google Cloud Platform (GCP), Microsoft Azure, etc. The entities that may use these public cloud providers include entities such as businesses (e.g., corporations), non-profit entities (e.g., hospitals, research organizations, etc.), and education entities (e.g., universities, colleges, etc.), according to some embodiments.

In some embodiments, the PKI 120 receives authentication resource requests from the machine 132. The authentication resource requests are CSRs, in some embodiments. For example, the PKI 120 receives a CSR 140 from the machine 132. In some embodiments, the authentication resource requests are requests for keys, java tokens, certificate bundles, etc. As mentioned above, the PKI 120, in some embodiments, communicates with both the controller 122 and the cloud provider interface module 124 to authenticate received requests.

For example, the PKI 120 uses the public IP address identified in the authentication resource request to request a cloud identifier associated with that public IP address from the controller 122, as illustrated by the request 144. The PKI 120 then uses the cloud identifier obtained from the controller 122 to request and obtain additional data from the cloud provider interface module 124, as illustrated in FIG. 1B. In some embodiments, the PKI 120 uses the data received from the controller 122 and the cloud provider interface module 124 to determine whether to provide the signed certificate to the requesting machine or to deny the request. Machines that have been authenticated (e.g., possess signed certificates) are considered to be trusted devices (e.g., trusted by the domain that deploys the machine), according to some embodiments. Additional details regarding the PKI and handling of authentication resource requests will be discussed below with reference to FIGS. 3-4.

Figure 2:
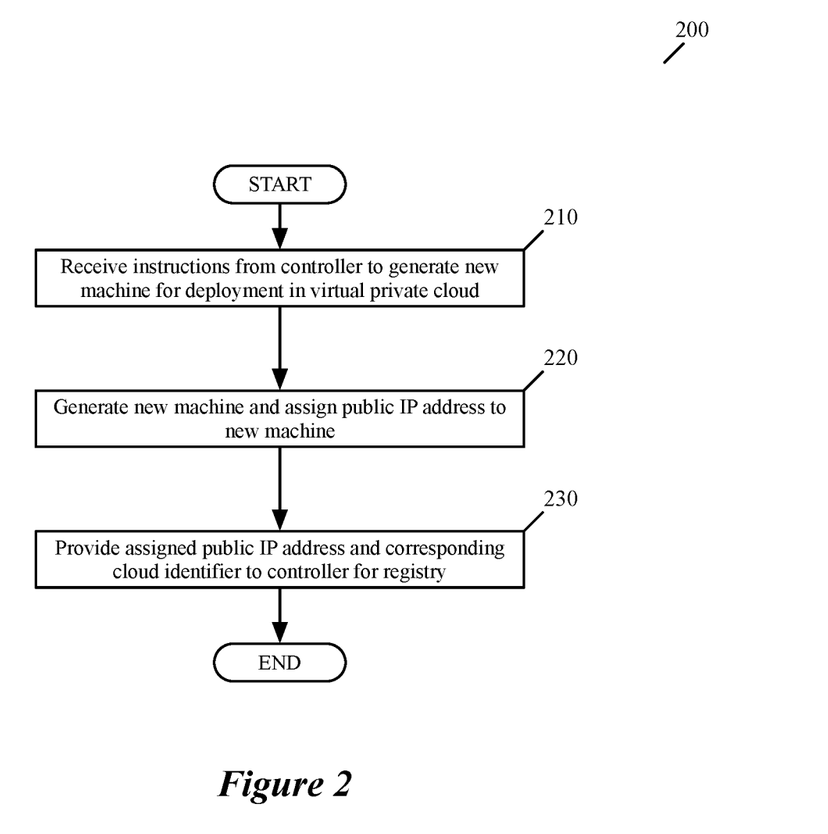
FIG. 2 conceptually illustrates a process for generating machines to deploy in private datacenters, according to some embodiments.

In some embodiments, as described with reference to FIG. 1A, the controller 122 and cloud provider interface module 124 is additionally responsible for generating the machines that are deployed in the virtual private clouds. FIG. 2 illustrates such a process 200 for a cloud provider interface module (e.g., cloud provider interface module 124) that creates machines for deployment to the virtual private clouds. The process 200 starts at 210 when the cloud provider interface module receives instructions from a controller to generate a new machine for deployment in a virtual private cloud. For example, at the encircled 1 of FIG. 1A, the controller 122 sends instructions to the cloud provider interface module 124 to create a new instance (e.g., machine) to be deployed in the virtual private cloud 130. As noted above, in some embodiments, the provider of the customer's cloud (e.g., the virtual private cloud 130) gives permission for the controller and the cloud provider interface module to deploy machines in the customer's cloud.

Next, at 220, the cloud provider interface module generates (e.g., using cloud APIs) the new machine as instructed and assigns a public IP address to the new machine. In the example embodiment of FIG. 1B, the machine 132 has an assigned public IP address of 9.8.7.6, as illustrated. The cloud identifiers for the machines in some embodiments, as mentioned above, are assigned by the tenant cloud in which they are deployed. The machine 132, for example, has an assigned cloud identifier ABC.

After the cloud provider interface module generates the new machine at 220, the process moves to 230 to provide the assigned public IP address, as well as the cloud identifier for the machine, to the controller in order to register the new machine with the controller. Registering the new machine with the controller/registry service allows for the PKI to later obtain the cloud identifier from the controller, according to some embodiments, which, in turn, allows for two points of authentication rather than a single point (i.e., the controller and the cloud provider interface module), and also provides a reliable identifier (i.e., the cloud identifier) for use by the PKI to ensure the identity of the machine. As mentioned above, the cloud provider interface module in some embodiments only provides the cloud identifier of the machine to the controller. In some such embodiments, the controller can subsequently use the cloud identifier to query the cloud provider interface module for the IP address (public or private) associated with that cloud identifier. Following 230, the process 200 ends.

Figure 3:
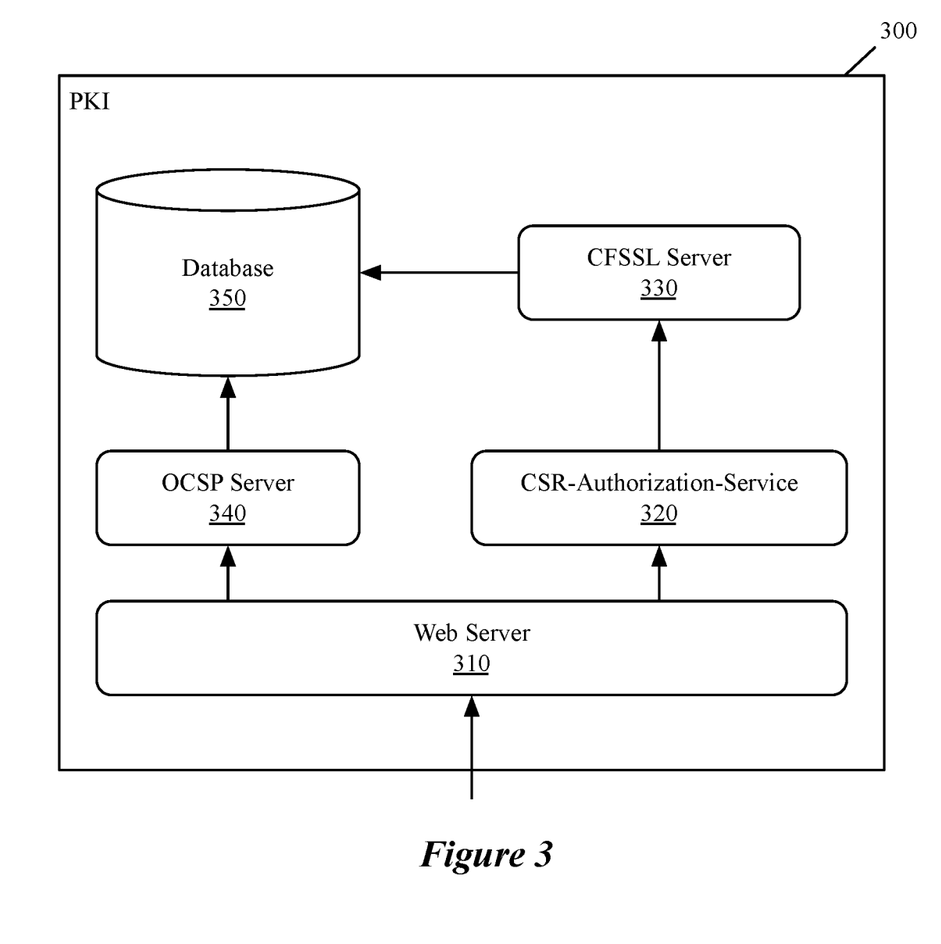
FIG. 3 conceptually illustrates an example embodiment of a public key infrastructure (PKI), according to some embodiments.

FIG. 3 conceptually illustrates an example of a detailed view of a PKI such as the PKI 120 described above, according to some embodiments. As shown, the PKI 300 includes web server 310, a CSR authorization service 320, a CFSSL server 330, an OCSP (Online Certificate Status Protocol) server 340, and a database 350.

In some embodiments, authentication resource requests sent to the PKI 300 are received by the web server 310. For example, the web server 310 routes received OCSP domain requests to the OCSP server 340, and routes received CSRs to the CSR authorization service 320, according to some embodiments. In some embodiments, the web server 310 is an Nginx web server that can be used as a load balancer, a reverse proxy (e.g., for resource retrieval), and an HTTP cache (e.g., for storing local copies of web resources).

The CFSSL server 330 is a command line tool and an HTTP API server for signing, verifying, and bundling certificates, according to some embodiments. For example, in some embodiments, when the web server 310 receives a CSR request, the web server 310 routes the CSR request to the CSR authorization service 320, which is responsible for requesting that certificates be signed (i.e., authorizes the signing of requests) by the CFSSL server 330. The CFSSL server 330, in some embodiments, may additionally generate keys and certificates for requesting entities, e.g., when no such certificates or keys exist. In some embodiments, the CFSSL server 330 may store certificates and keys in the database 350.

The OCSP server 340, in some embodiments, is used to obtain the revocation status of digital certificates. For example, in some embodiments, the OCSP server 340 receives OCSP domain requests (i.e., requests for revocation status of certificates) from the web server 310. In some such embodiments, the OCSP server 340 may perform a lookup in the database 350 to determine the revocation status of a certificate. The OCSP server 340 then issues a signed response to the request indicating whether the certificate is still good, revoked, or unknown, according to some embodiments.

In some embodiments, the database 350 is the database for OSCP server and CFSSL server services. The database 350, in some embodiments, is a free and open source relational database management system (RDBMS) (e.g., Postgres). As mentioned above, the database 350, in some embodiments, stores certificates, keys, and information relating to the stored certificates and keys.

Figure 4:
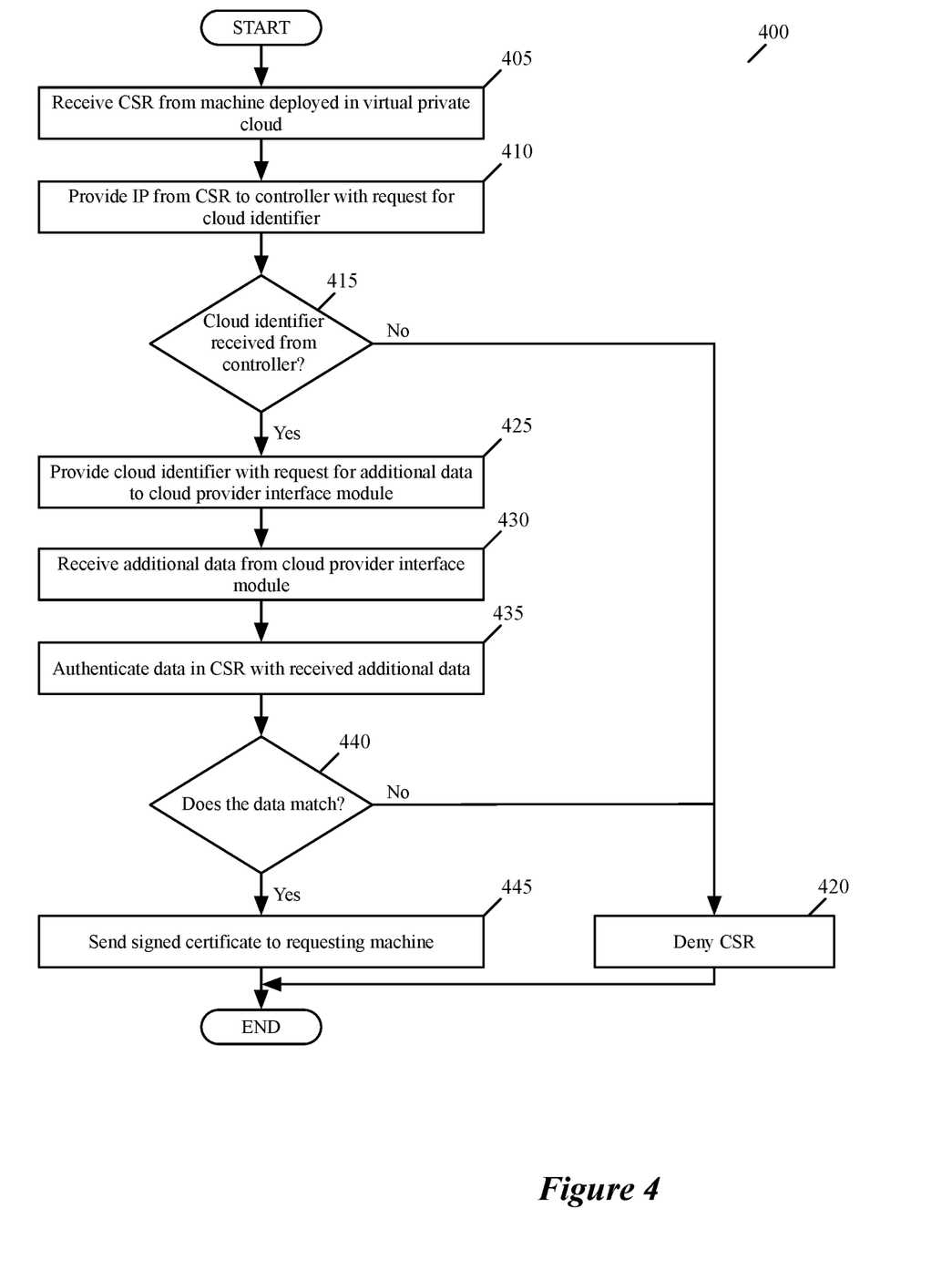
FIG. 4 illustrates a process for handling authentication resource requests from deployed machines, according to some embodiments.

FIG. 4 illustrates a process for handling an authentication resource request from a machine deployed in a virtual private cloud in a datacenter set (e.g., the machine 132), according to some embodiments. The process 400 will be described herein with reference to FIG. 1B. In some embodiments, as described above, the process is performed by a PKI (e.g., PKI 120, PKI 300). The process 400 begins at 405 by receiving a CSR from a machine deployed in a virtual private cloud. For instance, FIG. 1B illustrates a CSR 140 being sent from the machine 132 to the PKI 120 (e.g., at encircled 1). The request, in some embodiments, includes a first set of cloud-specific data. The cloud-specific data includes at least a public IP address (or other IP address) of the requesting machine (i.e., for the PKI to use to reply to the request). In some embodiments, the cloud-specific data is identified from a header of the request.

Next, at 410, the process provides the public IP address from the request (or other IP address identified from the request) to the controller along with a request for a cloud identifier associated with the public IP address. For example, the PKI 120 sends (e.g., at encircled 2) a request 142 to the controller 122 to determine whether a machine with the public IP address 9.8.7.6 (illustrated as the IP address of the machine 132) exists. As mentioned above, the registry service of the controller includes cloud identifiers for each machine deployed by the controller, as well as IP addresses associated with the cloud identifiers. In some embodiments, the controller receives the associated IP addresses from the cloud provider interface module along with the cloud identifiers. Alternatively, in some embodiments, the controller only receives the cloud identifiers, which it can subsequently use to query the cloud provider interface for the associated IP addresses.

At 415, the process determines whether a cloud identifier is received from the controller in response to the request sent in 410. If a cloud identifier has not been received from the controller (i.e., there is no cloud identifier associated with the public IP address in the registry), the process moves to 420 to deny the CSR. Otherwise, at 415, if a cloud identifier is received from the controller, the process transitions to 425. In the example of FIG. 1B, the PKI 120 receives a response 144 (e.g., at encircled 3) from the controller 122 to indicate that a machine with the public IP address 9.8.7.6 does exist and is associated with the cloud identifier ABC.

At 425, the process 400 provides the obtained cloud identifier to the cloud provider interface module with a request for additional data relating to the cloud identifier. For example, the PKI 120 sends (e.g., at encircled 4) a request 146 for information for the cloud identifier ABC to the cloud provider interface module 124. In some embodiments, the PKI only provides the cloud identifier along with the request to the cloud provider interface module in order to compare any data received from the cloud provider interface module with data from the controller, as well as data identified in the CSR, as will be discussed below.

Next, at 430, the process receives the requested additional data from the cloud provider interface module. Returning again to FIG. 1B, the PKI 120 receives the response 148 from the cloud provider interface module 124, the response 148 including the requested additional information (e.g., the second set of cloud-specific information) associated with the cloud identifier ABC. In some embodiments, the additional information includes an IP address (public or private) currently associated with the cloud identifier ABC at the time of the CSR.

At 435, the process authenticates the requesting machine by comparing the first set of cloud-specific data from the CSR (e.g., the IP address identified from the request) with the cloud identifier obtained from the controller and the second set of cloud-specific data (e.g., the IP address currently associated with the cloud identifier) obtained from the cloud provider interface module. For example, the PKI 120 authenticates the data e.g., at encircled 6.

By authenticating that the public IP address identified in the CSR matches the current IP address obtained from the cloud provider interface module based on the cloud identifier obtained from the controller using the public IP address identified in the CSR, the process can ensure that the requesting machine is truly the machine that was deployed by the cloud provider interface module. In other words, the process ensures (1) that another entity (e.g., the customer/tenant of the virtual private cloud, and/or a third-party entity with access to the virtual private cloud) has not used the public IP address assigned to the machine for a different device (i.e., as the public IP address itself is a resource that is or is not associated with any particular machine), and (2) that the IP address is currently used by the same machine at the time the PKI processes the CSR.

Thus, at 440, the process determines whether the first set of cloud-specific data and the second set of cloud-specific data match (i.e., whether the IP address identified in the request and the IP address currently associated with the cloud identifier match). If the process determines at 440 that the data does not match, the process transitions to 420 to deny the CSR. Otherwise, if the process determines that the data does match at 440, the process transitions to 445 to send the signed certificate to the requesting machine. For example, the PKI 120 sends the signed certificate 150 to the machine 132 (e.g., at encircled 7). The process 400 then ends.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 5:
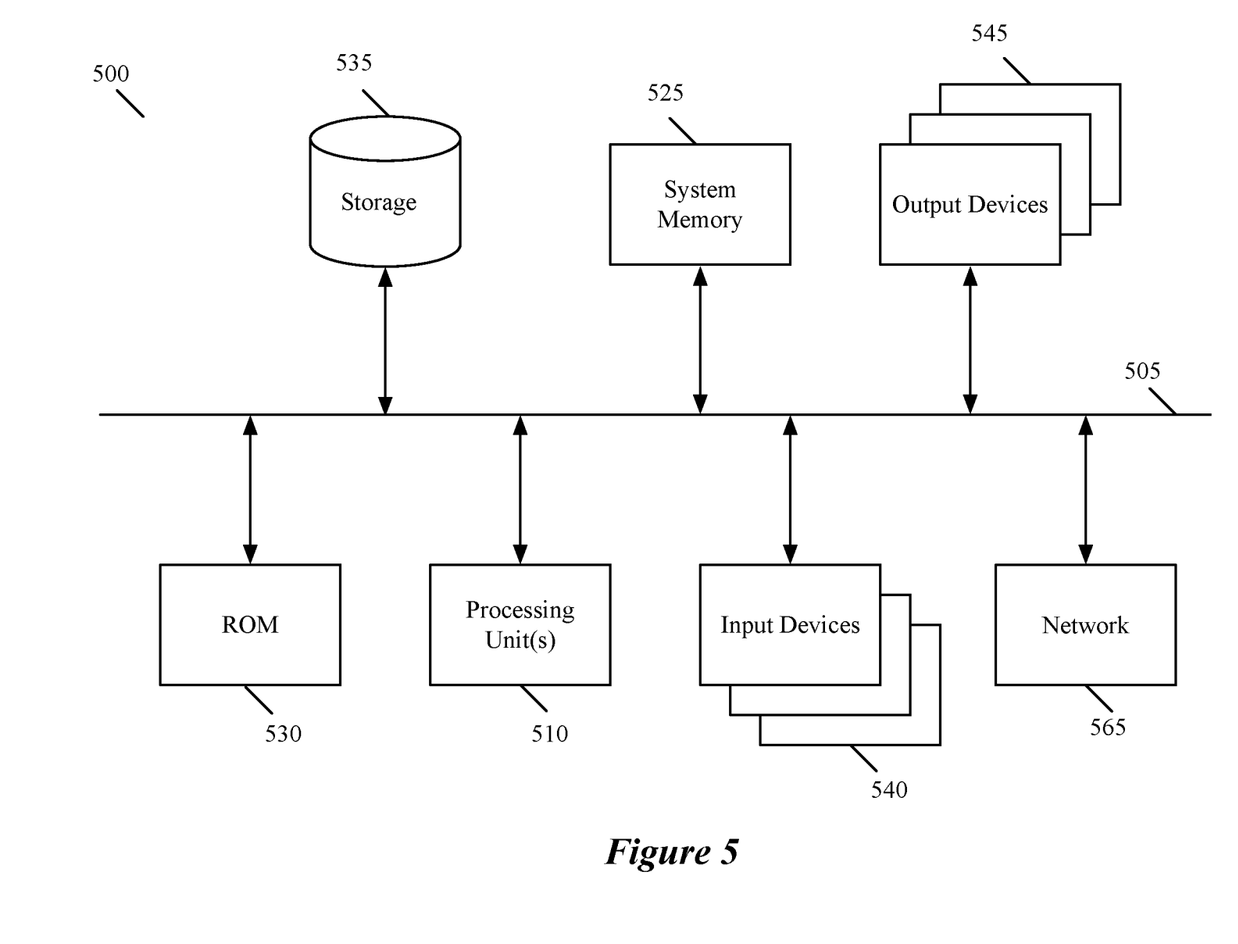
FIG. 5 conceptually illustrates a computer system with which some embodiments of the invention are implemented.

FIG. 5 conceptually illustrates a computer system 500 with which some embodiments of the invention are implemented. The computer system 500 can be used to implement any of the above-described machines, controllers, and modules. As such, it can be used to execute any of the above described processes. This computer system includes various types of non-transitory machine readable media and interfaces for various other types of machine readable media. Computer system 500 includes a bus 505, processing unit(s) 510, a system memory 525, a read-only memory 530, a permanent storage device 535, input devices 540, and output devices 545.

The bus 505 collectively represents all system, peripheral, and chipset buses that communicatively connect the numerous internal devices of the computer system 500. For instance, the bus 505 communicatively connects the processing unit(s) 510 with the read-only memory 530, the system memory 525, and the permanent storage device 535.

From these various memory units, the processing unit(s) 510 retrieve instructions to execute and data to process in order to execute the processes of the invention. The processing unit(s) may be a single processor or a multi-core processor in different embodiments. The read-only-memory (ROM) 530 stores static data and instructions that are needed by the processing unit(s) 510 and other modules of the computer system. The permanent storage device 535, on the other hand, is a read-and-write memory device. This device is a non-volatile memory unit that stores instructions and data even when the computer system 500 is off. Some embodiments of the invention use a mass-storage device (such as a magnetic or optical disk and its corresponding disk drive) as the permanent storage device 535.

Other embodiments use a removable storage device (such as a floppy disk, flash drive, etc.) as the permanent storage device. Like the permanent storage device 535, the system memory 525 is a read-and-write memory device. However, unlike storage device 535, the system memory is a volatile read-and-write memory, such as random access memory. The system memory stores some of the instructions and data that the processor needs at runtime. In some embodiments, the invention's processes are stored in the system memory 525, the permanent storage device 535, and/or the read-only memory 530. From these various memory units, the processing unit(s) 510 retrieve instructions to execute and data to process in order to execute the processes of some embodiments.

The bus 505 also connects to the input and output devices 540 and 545. The input devices enable the user to communicate information and select commands to the computer system. The input devices 540 include alphanumeric keyboards and pointing devices (also called "cursor control devices"). The output devices 545 display images generated by the computer system. The output devices include printers and display devices, such as cathode ray tubes (CRT) or liquid crystal displays (LCD). Some embodiments include devices such as touchscreens that function as both input and output devices.

Finally, as shown in FIG. 5, bus 505 also couples computer system 500 to a network 565 through a network adapter (not shown). In this manner, the computer can be a part of a network of computers (such as a local area network ("LAN"), a wide area network ("WAN"), or an Intranet), or a network of networks (such as the Internet). Any or all components of computer system 500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, several of the above-described embodiments provide an identifier of a deployed machine to the controller along with an IP address associated with the deployed machine. However, in other embodiments, the controller receives the identifier of the machine from the cloud provider interface module and uses the identifier to subsequently query the cloud provider interface module for the associated IP address. Thus, one of ordinary skill in the art would understand that the invention is not to be limited by the foregoing illustrative details, but rather is to be defined by the appended claims.

The invention claimed is:

1. A method for providing an authentication resource to a particular virtual private cloud that is deployed in a set of datacenters that host a plurality of virtual private clouds, the method comprising:
  at a resource issuer,
    receiving an authentication resource request from a particular machine deployed in the particular virtual private cloud, the authentication resource request comprising a first set of cloud-specific data;
    obtaining a cloud identifier for the particular machine from a registry service of the particular virtual private cloud that interacts with a datacenter-set cloud service that deploys machines in the datacenter set for different virtual private clouds, said cloud identifier identifying the particular machine from a plurality of other machines that are identified by other cloud identifiers from the registry service;
    using the obtained cloud identifier to obtain a second set of cloud-specific data for the particular machine from the datacenter-set cloud service; and
    upon determining that the first and second sets of cloud-specific data match, authenticating the particular machine and issuing the authentication resource for the particular machine.

2. The method of claim 1, wherein the first set of cloud-specific data comprises at least a network address of the particular machine, and the second set of cloud-specific data comprises at least a network address currently associated with the cloud identifier.

3. The method of claim 2, wherein obtaining the cloud identifier from the registry service comprises verifying that the particular machine is one of the machines deployed by the datacenter-set cloud service.

4. The method of claim 3, wherein determining that the first and second sets of cloud-specific data match further comprises determining that the network address of the particular machine from the authentication resource request matches the network address currently associated with the cloud identifier for the particular machine.

5. The method of claim 1, wherein the authentication resource request is a first authentication resource request, the particular machine is a first machine, and the particular virtual private cloud is a first virtual private cloud, the method further comprising:
  at the resource issuer,
    receiving a second authentication resource request from a second machine deployed in a second virtual private cloud, the second authentication resource request comprising a third set of cloud-specific data;
    obtaining a cloud identifier for the second machine from a registry service of the second virtual private cloud that interacts with the datacenter-set cloud service;
    using the obtained cloud identifier to obtain a fourth set of cloud-specific data for the second machine from the datacenter-set cloud service; and
    upon determining that the third and fourth sets of cloud-specific data do not match, denying the authentication resource request from the second machine.

6. The method of claim 1, wherein the authentication resource request is a first authentication resource request, the particular machine is a first machine, and the particular virtual private cloud is a first virtual private cloud, the method further comprising:
  at the resource issuer,
    receiving a second authentication resource request from a second machine deployed in a second virtual private cloud, the second authentication resource request comprising a third set of cloud-specific data;
    determining that the second machine is not registered with the registry service; and
    denying the authentication resource request from the second machine.

7. The method of claim 1, wherein the authentication resource issuer comprises a public key infrastructure.

8. The method of claim 1, wherein the registry service comprises a controller that communicates with the datacenter-set cloud service to instruct the datacenter-set cloud service to create machines to be deployed in the datacenter set.

9. The method of claim 1, wherein the particular machine comprises a forwarding element.

10. The method of claim 1, wherein the particular machine comprises a virtual machine (VM) or a container.

11. The method of claim 1, wherein:
  a first provider of the particular virtual private cloud is different from a second provider of the datacenter-set cloud service that deploys machines in the datacenter set for different virtual private clouds including the particular virtual private cloud; and
  the first provider of the particular virtual private cloud grants permission the second provider of the datacenter-set cloud service to allow to the datacenter-set cloud service to deploy machines including the particular machine in the datacenter set for the particular virtual private cloud.

12. The method of claim 1, wherein the authentication resource issued to the particular machine is a unique authentication resource.

13. The method of claim 12, wherein the unique authentication resource comprises a unique certificate or a unique Java token.

14. The method of claim 12, wherein the unique authentication resource is used by the particular machine to indicate that the particular machine is a trusted machine.

15. A non-transitory machine readable medium storing a program for execution by a set of processing units, the program for providing an authentication resource to a particular virtual private cloud that is deployed in a set of datacenters that host a plurality of virtual private clouds, the program comprising sets of instructions for:
  at a resource issuer,
    receiving an authentication resource request from a particular machine deployed in the particular virtual private cloud, the authentication resource request comprising a first set of cloud-specific data;
    obtaining a cloud identifier for the particular machine from a registry service of the particular virtual private cloud that interacts with a datacenter-set cloud service that deploys machines in the datacenter set for different virtual private clouds, said cloud identifier identifying the particular machine from a plurality of other machines that are identified by other cloud identifiers from the registry service;

using the obtained cloud identifier to obtain a second set of cloud-specific data for the particular machine from the datacenter-set cloud service; and upon determining that the first and second sets of cloud-specific data match, authenticating the particular machine and issuing the authentication resource for the particular machine.

16. The non-transitory machine readable medium of claim 15, wherein the first set of cloud-specific data comprises at least a network address of the particular machine, and the second set of cloud-specific data comprises at least a network address currently associated with the cloud identifier.

17. The non-transitory machine readable medium of claim 16, wherein the set of instructions for obtaining the cloud identifier from the registry service further comprises a set of instructions for verifying that the particular machine is one of the machines deployed by the datacenter-set cloud service.

18. The non-transitory machine readable medium of claim 17, wherein the set of instructions for determining that the first and second sets of cloud-specific data match further comprises a set of instructions for determining that the network address of the particular machine from the authentication resource request matches the network address currently associated with the cloud identifier for the particular machine.

19. The non-transitory machine readable medium of claim 15, wherein the authentication resource request is a first authentication resource request, the particular machine is a first machine, and the particular virtual private cloud is a first virtual private cloud, the program further comprising sets of instructions for:

at the resource issuer, receiving a second authentication resource request from a second machine deployed in a second virtual private cloud, the second authentication resource request comprising a third set of cloud-specific data;

obtaining a cloud identifier for the second machine from a registry service of the second virtual private cloud that interacts with the datacenter-set cloud service;

using the obtained cloud identifier to obtain a fourth set of cloud-specific data for the second machine from the datacenter-set cloud service; and upon determining that the third and fourth sets of cloud-specific data do not match, denying the authentication resource request from the second machine.

20. The non-transitory machine readable medium of claim 15, wherein the authentication resource request is a first authentication resource request, the particular machine is a first machine, and the particular virtual private cloud is a first virtual private cloud, the program further comprising sets of instructions for:

at the resource issuer, receiving a second authentication resource request from a second machine deployed in a second virtual private cloud, the second authentication resource request comprising a third set of cloud-specific data;

determining that the second machine is not registered with the registry service; and denying the authentication resource request from the second machine.

21. The non-transitory machine readable medium of claim 15, wherein the resource issued to the particular machine is a unique authentication resource comprising a unique certificate or a unique Java token.

22. The method of claim 21, wherein the unique authentication resource is used by the particular machine to indicate that the particular machine is a trusted machine.

* * * * *